United States Patent [19]

Sigmund

[11] Patent Number: 4,531,871
[45] Date of Patent: Jul. 30, 1985

[54] MULTIGRIP FASTENER

[75] Inventor: Jerry A. Sigmund, Bala Cynwyd, Pa.

[73] Assignee: Aerpat A.G., Zug, Switzerland

[21] Appl. No.: 486,706

[22] Filed: Apr. 20, 1983

[51] Int. Cl.³ .............................................. F16B 19/00
[52] U.S. Cl. ...................................... 411/361; 411/70
[58] Field of Search ....................... 411/361, 39, 43, 70

[56] References Cited

U.S. PATENT DOCUMENTS

| Re. 30,445 | 12/1980 | Ruhl | 411/361 |
|---|---|---|---|
| 2,955,505 | 10/1960 | Schuster | 411/361 |
| 4,208,943 | 6/1980 | Smith | 411/361 |
| 4,233,879 | 11/1980 | Sigmund | 411/361 |

FOREIGN PATENT DOCUMENTS 2083586  3/1982  United Kingdom ................ 411/361

*Primary Examiner*—Gary L. Smith
*Assistant Examiner*—Adrian H. Whitcomb, Jr.
*Attorney, Agent, or Firm*—Oblon, Fisher, Spivak, McClelland & Maier

[57] ABSTRACT

A two piece fastener includes a pin member having a head and a shank portion having a plurality of grooves thereon, as well as a tubular membered swaged into locking engagement with a predetermined number of the grooves by means of a tool having a swaging anvil. A number of the grooves are combination locking and breakneck grooves defined by first and second radially outwardly diverging sidewalls, the juncture of the sidewalls at each of the grooves including a concave radius portion interconnecting the radially inner ends of the first and second sidewalls, a number of the grooves being located approximate the outer end of the tubular member for receiving the material of the tubular member as it is swaged. The first and second sidewalls are angulated so as to provide a relative force between the sidewalls in the selected ones of the grooves.

13 Claims, 5 Drawing Figures

MULTIGRIP FASTENER

FIELD OF THE INVENTION

This invention relates to a two piece fastener system which can be adapted to be utilized in securing a broad range of material thicknesses.

BACKGROUND OF THE INVENTION

The present invention relates generally to fasteners and more specifically to two piece fasteners which are adapted to be utilized in securing a broad range of material thicknesses.

In some applications it would be desirable to use a two piece fastener of the type employing a pin having combination locking and breakneck grooves and a tubular member adapted to be swaged thereto and in which any of these grooves is capable of functioning as a breakneck so as to enable a single fastener to be utilized over a broad range of material thicknesses. One problem with such a fastener is providing a structure in which the pin break will occur repeatedly and consistently in a desired one of the combination grooves. Attempts to provide such a structure have generally included a pin having substantially identical combination locking and breakneck grooves. See, for example, U.S. Pat. Nos. 4,208,943, 4,342,529, and 4,347,728 issued to Smith. In these inventions, an axially directed force generated by the swaging of the tubular member into a preselected one of the combination grooves is utilized at a preselected groove which force when combined with pulling force applied by an installation tool will provide a combined tensile force at the selected groove whereby fracture will occur and hence that groove when selected functions as a breakneck. However, because the tubular member is swaged into a plurality of combination grooves which are substantially identical prior to the pin breaking, and because minor uncontrolled differences actually occur in the groove dimensions as a result of manufacturing variations, the pin break may not repeatedly and consistently occur in the desired groove.

In some instances it has been desirable to use multigrip fasteners with installation tools having jaws of a conventional structure. This has necessitated using pins with pull grooves that engage the jaws of the tool which have stress concentration factors which are substantially different than the stress concentration factors for the combination grooves. Because of the difference in shape between the pull grooves and combination grooves, it may be necessary to roll these grooves in separate manufacturing processes or to provide a transition portion located between the pull grooves and combination grooves. This transition portion adds unnecessary material and cost to the pin.

Accordingly, it is an object of this invention to provide a multigrip fastener with a higher degree of installation reliability than those currently available.

It is another object of this invention to minimize the fastener cost.

BRIEF DESCRIPTION OF THE INVENTION

A multigrip fastener according to this invention consists of a pin member and a tubular member. The pin includes combination locking and breakneck grooves and pulling grooves. The combination grooves have a geometry such that each groove includes a pair of radially outwardly diverging sidewalls defining the groove, each of which sidewall forms a different angle with respect to a radial plane extending transversely through the pin member and controlled radius portions interconnecting adjacent end portions thereof. A sidewall of each combination groove forms a different angle with respect to the radial plane than the corresponding sidewall of any other combination groove such that the axially directed force generated by the swaging of the tubular member into a preselected one of the combination grooves is greater in the preselected groove than any other combination groove. Thus, when this force is combined with the pulling force of the installation tool, the combined tensile force at the selected groove is greater than at any other combination groove, whereby fracture will occur and hence that groove when selected functions as a breakneck.

Accordingly, the present invention provides a two piece fastener having improved combination grooves which extend along the shank portion of the pin a distance at least equal to the difference between the minimum and maximum workpiece thickness for which the fastener is to be used. This invention thereby enables a single fastener to be utilized to secure materials having a wide variety of total thicknesses. This feature affords substantial cost savings to users of such fasteners both by reducing the number of different fasteners required to be purchased and carried in their inventory as well as increasing product reliability of reducing the likelihood of a fastener with an inappropriate gripping range being inadvertently used.

The pulling grooves are optionally configured to develop a stress concentration factor substantially equal to the stress concentration factor for the combination grooves. This facilitates the manufacturing of the pin by enabling both combination and pulling grooves to be rolled in one continuous manufacturing process.

The above and other features of this invention will be fully understood from the following detailed description and the accompanying drawings, in which:

DESCRIPTION OF THE PREFERRED EMBODIMENT

Figure 1:
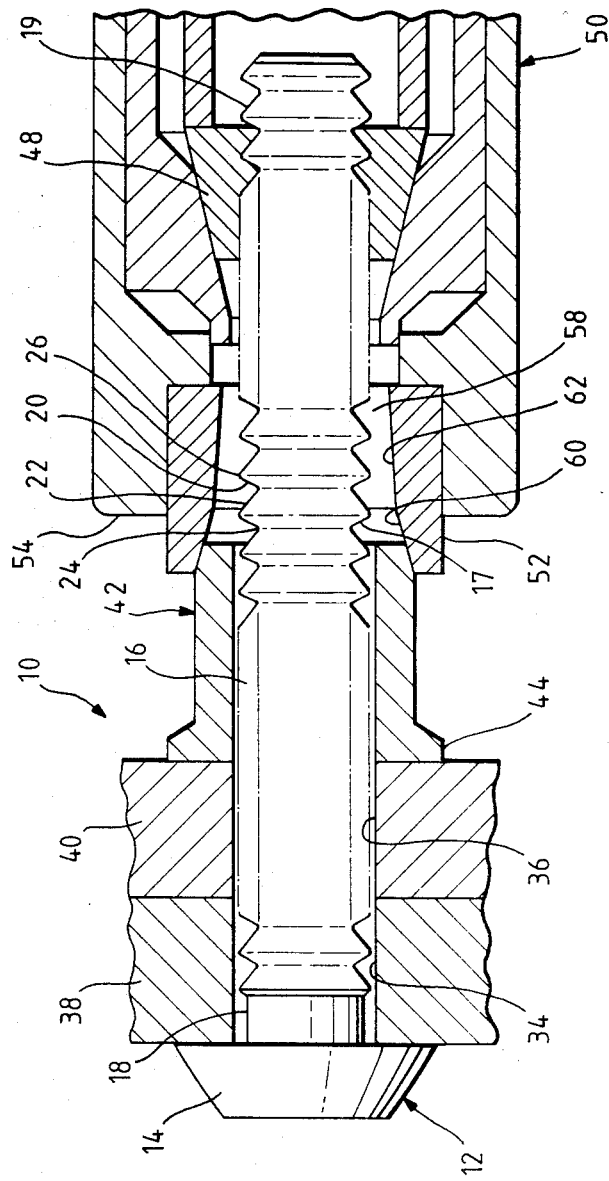
FIG. 1 is a partial sectional view of a fastener in accordance with the present invention shown in operative relation to a pair of workpieces and having an installation tool in initial engagement with the fastener.

Referring to FIG. 1, there is illustrated a fastener indicated generally at 10 in accordance with the present invention and comprising a pin member 12 having a head 14 provided on one end thereof and an elongated shank portion 16.

Shank portion 16 has a plurality of annular combination locking and breakneck grooves 17 and a plurality of annular pulling grooves 19, the pulling grooves 19 being located a greater distance from pin head 14 than the combination grooves 17. Shank portion 16 may include a relatively short smooth cylindrical portion 18 immediately adjacent the head 14. While smooth cylindrical portion 18 is illustrated as being relatively short, it may extend up to a length equal to a predetermined minimum total material thickness with which fastener 10 is to be used. Thus, combination grooves 17 will extend along a length of shank 16 from a point greater than this predetermined minimum thickness to a point generally where pulling grooves 19 begin. Each of combination grooves 17 is defined by radially outwardly diverging sidewalls 20 and 22 which are connected at their radially inner ends by a generally concave radius portion 24. The radially outer end of sidewall 20 is interconnected with the radially outer end of sidewall 22 of the next adjacent groove 17 by a generally convex portion, or crest 26 and, in like manner, a substantially identical convex radius portion 26 also connects the radially outer end of sidewall 22 with sidewall 20 of the next adjacent groove 17.

Figure 2:
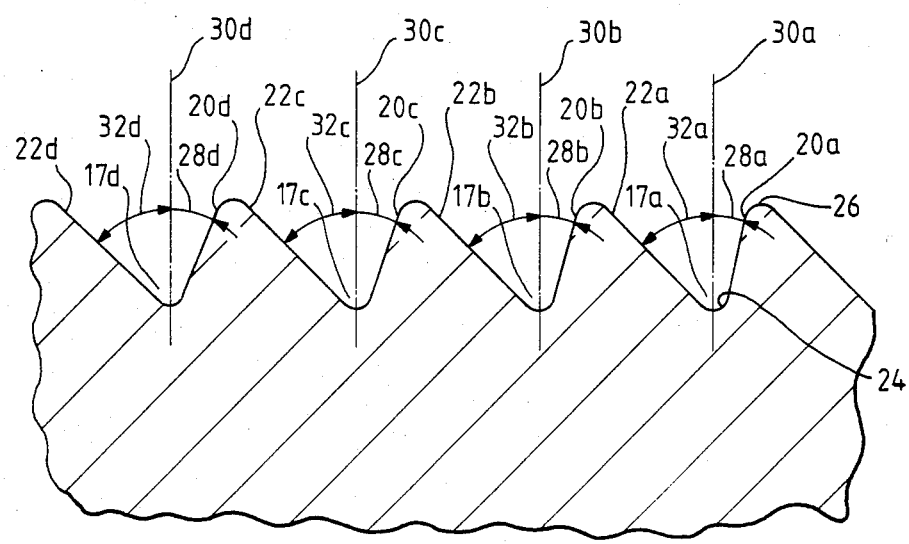
FIG. 2 is a partial fragmentary sectioned view of a portion of the fastener pin of FIG. 1 illustrating the groove geometry of the present invention, the section being taken along an axial plane.
Figure 5:
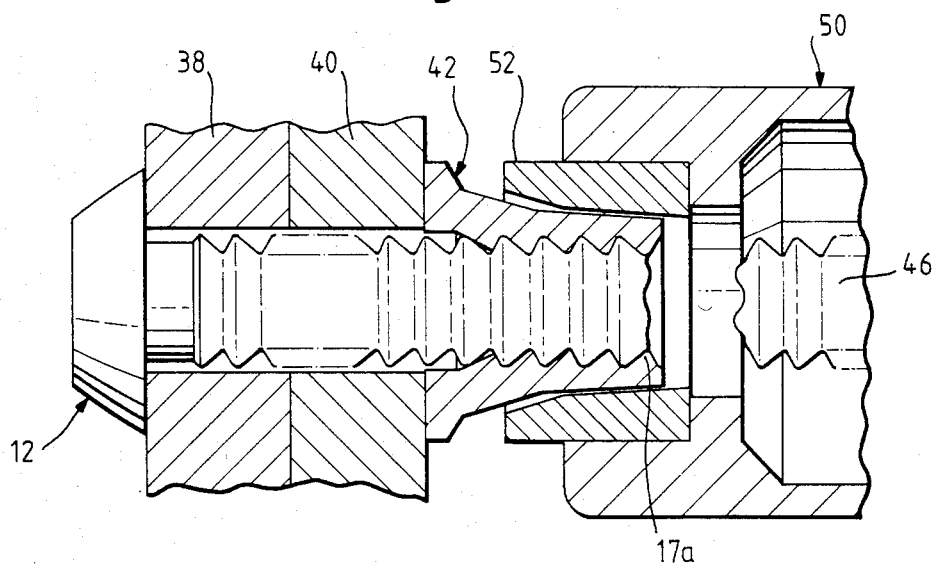
FIGS. 3 through 5 are a sequence of views each similar to FIG. 1 but illustrating the installation sequence from initial swaging of the tubular member through completed swage and pin break.

Referring now to FIG. 2, there is illustrated a plurality of combination grooves 17, specifically combination grooves 17a, 17b, 17c, and 17d. Combination groove 17a is representative of each combination groove 17 and includes sidewall 20a and sidewall 22a. Sidewall 20a is located a greater distance from head 14 than sidewall 22a. Sidewall 20a is disposed at a substantially smaller angle 28a relative to a radius plane 30a extending transversely through the shank portion 16 than the angle 32a formed between sidewall 22a and radial plane 30a. Likewise, sidewall 20b is disposed at a substantially smaller angle 28b relative to a radial plane 30b extending transversely through the shank portion 16 than the angle 32b formed between sidewall 22b and radial plane 30b. It is noted that combination groove 17a is a greater distance from head 14 than combination groove 17b, and so on. To obtain the desired reliability, as will be described hereinafter, angle 28a is smaller than angle 28b, angle 28b is smaller than angle 28c, and so on. Angle 32a is preferably substantially equal to angle 32b, angle 32b is preferably substantially equal to angle 32c, and so on. Thus, the total included angle between sidewall 20 and sidewall 22 decreases for each combination groove 17 as the distance from the head increases. It is believed that the present invention provides satisfactory results when angle 32 is about 45 degrees and angle 28 increases from a minimum of about 15 degrees to a maximum of about 25 degrees. Thus, for a pin with a total of ten combination grooves 17, the total included angle between sidewalls 20 and 22 would decrease about 1 degree for each combination groove as the distance from head 14 increased. The major and minor diameters defined by the radial extent of convex radius portion 26 and concave radius portion 24 are substantially identical for each combination groove 17. The change in total included angle for each combination groove 17 is preferably identical and preferably less than 2 degrees.

The annular pulling grooves 19 are preferably immediately adjacent combination grooves 17 and are substantially identical from groove to groove. Pulling grooves 19, alternatively referred to as gripping grooves, preferably have a shape which is substantially similar to one of the combination grooves 17. By having a similar shape, including a concave radius portion similar to concave radius portion 24, the stress concentration for the pulling grooves is substantially similar to the stress concentration for the combination grooves 17. Thus, the ability to roll pulling grooves 19 and combination grooves 17 simultaneously, during the manufacturing process of pin member 12, is enhanced. Pulling grooves 19 may optionally be of a shape substantially different than any of the combination grooves 17.

Referring now to FIGS. 1 and 3 through 5, it is seen that fastener 10 is designed to be inserted in aligned openings 34 and 36 provided in a pair of members 38 and 40 respectively, which are to be joined by fastener 10. A tubular member 42 in the form of a generally cylindrically shaped collar is placed on shank portion 16 with flanged end portion 44 thereof being brought into engagement with member 40. As shown, the axial extent of the combination grooves 17 is of a length greater than the total thickness of members 38 and 40 plus the axial length of collar 42. Immediately adjacent combination grooves 17 are pulling grooves 19 which grooves my be engaged by jaws 48 of pulling tool 50.

Pulling tool 50 is of a conventional construction having a swaging anvil 52 extending outwardly from the nose portion 54 of the tool 50. The jaws 48 are adapted to be moved rearwardly relative to anvil 52 as shown in the drawings. Anvil 52 has a central frusto-conical shaped opening 58 provided therein having a first relatively sharply tapered inner portion 60 and a second tapered inner portion 62. Actuation of pulling tool 50 will cause jaws 48 to engage and grip a predetermined number of pulling grooves 19 and thereby exert a pulling or tensioning force upon pin 12 and against collar 42. During the initial stages of the pulling action, anvil 52 exerts an oppositely directed force on collar 42 thereby causing members 38 and 40 to be drawn into mutual engagement.

Figure 3:
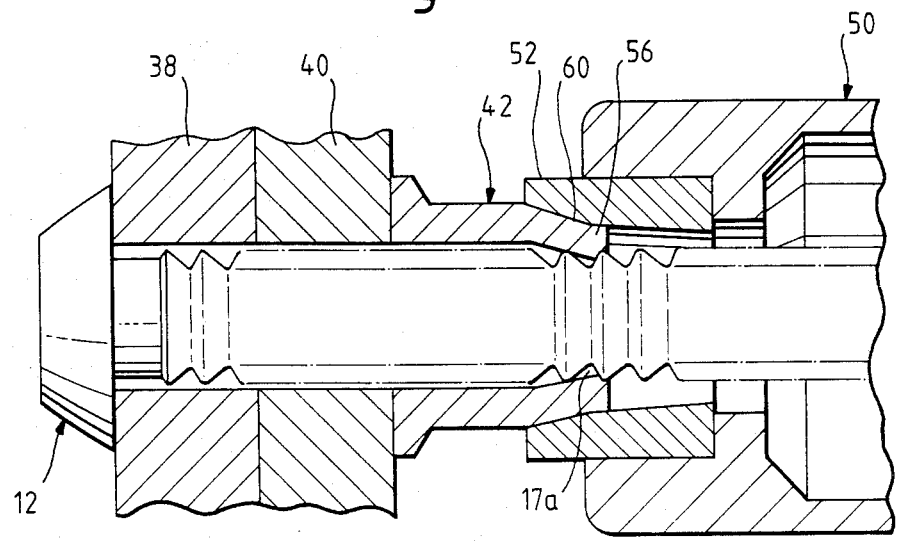
Figure 4:
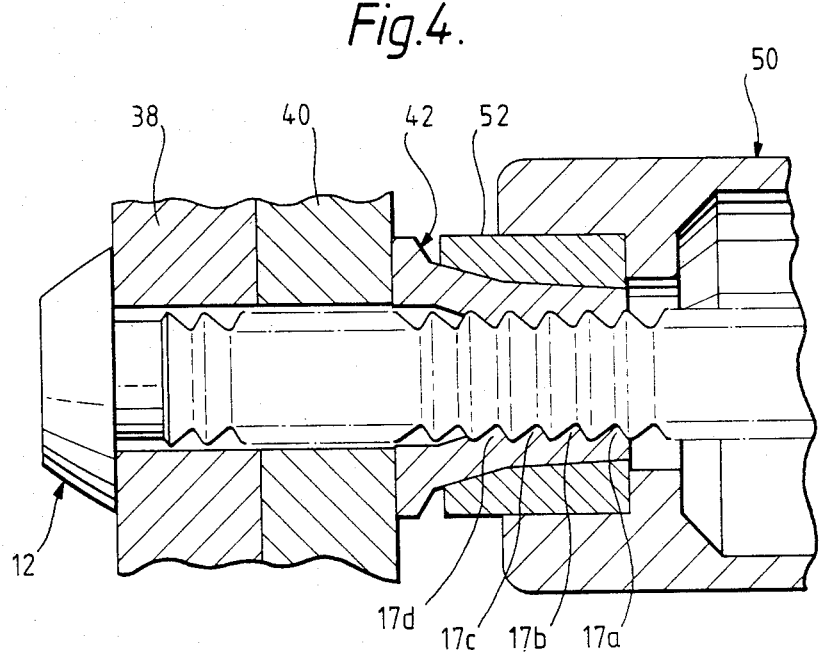

Thereafter, as best seen in FIG. 3, portion 60 of anvil 52 begins to deform or cause the outer end portion 56 of collar 42 to be extruded into a preselected one 17a of combination grooves 17. The initial deformation causes a locking action to occur between collar 42 and pin 12. Thereafter, continued movement of jaws 48 cause anvil 52 to move along collar 42 thereby causing the collar material to flow into combination grooves 17b, 17c, 17d, and possibly others approaching members 38 and 40 as well as continuing to compress the collar material which has been swaged into grooves 17a, 17b, and so on.

Because of the defined groove configuration, the continued compression and flow of the collar material into grooves 17a, 17b, and so on causes an axially directed localized force to be exerted on sidewall 20 of each groove receiving material from collar 42. In prior art fasteners with substantially identical combination locking and breakneck grooves, variations in dimensions of the grooves due to manufacturing tolerances and the relatively gradual taper 62 of anvil 52 can result in similar axially directed forces occurring in more than one groove in which collar material is flowing. Thus, it is not always possible to predict which groove will act as a breakneck. As best seen in FIG. 2, by configuring the combination grooves 17 such that the total included angle for each combination groove 17 decreases as the distance from head 14 increases, the axially directed component of force will increase for each combination groove 17 as the distance from head 14 increases; accordingly, groove 17a will have a greater component of axial force than groove 17b, groove 17b will have a greater axial force component than groove 17c, and so on. Since the combination groove with the smallest included angle will always be the groove receiving collar material adjacent end portion 56 of collar 42, this groove, groove 17a, will develop a greater axially directed force than any other groove receiving collar material. The axially directed component of force developed by the continued compression and flow of the collar material in combination with the axial tension exerted by the pulling action of the jaws 48 will cause groove 17a to function as a breakneck with end portion 46 of pin 12 breaking thereat. Because the breakneck will now more consistently occur in the first groove receiving collar material, a fastener system with a higher degree of reliability is provided.

To further enhance reliability, concave radius portion 24 is selected so as to provide an area of predetermined controlled stress concentration which facilitates fracture at the desired combination groove 17. Also, radiused convex portion 26 operates to facilitate metal flow into combination grooves 17. Concave radius portion 24 is substantially identical for each combination groove 17.

It is noted that in the present invention the total tensile load required to effect pin break of the pin member when installed in combination with the tubular member will be lower than the tensile load required to effect pin break thereof without the cooperation of the tubular member.

It is also noted that some combination grooves 17 cannot function as breakneck grooves. For example, in determinable minimum thickness workpieces, combination groove 17a is the only groove which can function as a breakneck groove. Grooves 17b, 17c, and so on can only be locking grooves since reduced thickness workpieces cannot be encountered. Accordingly, grooves 17b, 17c, and so on may optionally be substantially identical when, in reality, these grooves can never function as combination locking and breakneck grooves.

In summary, the present invention comprises the concepts of utilizing a pin having a plurality of grooves which function both as locking and breakneck grooves and in which the unique configuration of the combination grooves provides a means whereby any one of the grooves located at a selected location proximate the outer end of the collar will function as a breakneck. This ability to consistently control the groove at which fracture occurs enables a single fastener to be manufactured which can accommodate a very broad range of material thicknesses. In addition, the combination grooves and pulling or gripping grooves are configured to facilitate manufacture of the pin.

It should be noted that while the present invention has been described with reference to a two piece fastener having a pin and swageable collar, the principles are also applicable to fabrication of a blind fastener in which tubular member 42 may be in the form of a cylindrical sleeve having an outer portion adapted to be swaged to a pin in a manner similar to that described above.

While in the foregoing there has been described a preferred embodiment of the invention, it should be understood to those skilled in the art that various modifications and changes can be made without departing from the true spirit and scope of the invention as recited in the claims.

I claim:

1. A two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement with a predetermined number of said grooves on the shank portion of the pin member by means of a tool having a swaging anvil adapted to engage the tubular member and gripping means adapted to grip a gripping portion of the shank portion, the tool being actuable to apply a relative axial tensile force between the pin member and the tubular member whereby the tubular member is swaged into said predetermined number of said grooves on the shank portion of the pin member, at least said predetermined number of said grooves being annular combination locking and breakneck grooves, each of said annular combination locking and breakneck grooves being defined by first and second radially outwardly diverging sidewalls, the juncture of said diverging sidewalls at each of the grooves including a concave radius portion interconnecting the radially inner ends of said first and second sidewalls, a selected one the grooves being located at a predetermined location proximate the outer end of the tubular member and adapted to receive the material of the tubular member as it is swaged onto the shank portion, said first and second sidewalls being angulated such as to provide a relative force between said sidewalls in said selected one of the grooves, said force being generated by the material of the tubular member as it is swaged therein, said force being greater in said selected one of the grooves than any other of said annular combination locking and breakneck grooves which receive the material of the tubular member as it is swaged onto the shank portion, wherein said relative force will be additive with the relative axial tensile force applied by the tool such that the shank portion will fracture at said selected one of the grooves, any one of said annular combination locking and breakneck grooves being capable of functioning as said selected one of the grooves when located at said predetermined location while said pulling tool exerts the relative axial tensile force on the pin member, wherein said first sidewall is inclined radially outward toward said head and said second sidewall is inclined radially outward away from said head, and the included angle defined by said first and second sidewalls decreases for each of said annular combination locking and breakneck grooves as the distance from said head increases.

2. A two piece fastener in accordance with claim 1 wherein said concave radius portion is selected to provide a predetermined stress concentration to facilitate fracture at said selected one of the grooves in response to the combination of said relative force and said relative axial tensile force.

3. A two piece fastener in accordance with claim 2 wherein said gripping portion of the shank portion is located at the end opposite said head and includes a plurality of gripping grooves adapted to be gripped by the gripping means of the tool, said gripping grooves having an effective stress concentration substantially similar to said predetermined stress concentration.

4. A two piece fastener in accordance with claim 3 wherein said gripping grooves have a shape which is substantially similar to at least one of said combination locking and breakneck grooves.

5. A two piece fastener in accordance with claim 1 wherein said selected one of the grooves is the first of the grooves adjacent the outer end of the tubular member to be filled by swaging of the tubular member.

6. A two piece fastener in accordance with claim 1 wherein said tubular member comprises a collar located on the shank portion of the pin on the side of the workpiece opposite the pin head.

7. A two piece fastener in accordance with claim 1 wherein said second sidewall forms an included angle with a radial plane extending transversely through said shank portion, said included angle with the radial plane decreases for each of said annular combination locking and breakneck grooves as the distance from said head increases.

8. A two piece fastener in accordance with claim 7 wherein said included angle with the radial plane varies from about 15 degrees to about 25 degrees.

9. A fastener comprising a pin and a collar, said pin including a head on one end thereof and a shank including a plurality of annular combination locking and breakneck grooves and a plurality of substantially identical gripping grooves on the end opposite said head, each of said combination locking and breakneck grooves capable of acting as either a locking or breakneck groove and including a first sidewall inclined radially outward toward said head and a second sidewall inclined radially outward away from said head, the total included angle defined by said first and second sidewalls decreases for each of said annular combination locking and breakneck grooves as the distance from said head increases.

10. A fastener in accordance with claim 9 wherein said second sidewall forms an included angle with a radial plane extending transversely through said shank, said included angle with the radial plane decreases for each of said annular combination locking and breakneck grooves as the distance from the head increases.

11. A fastener in accordance with claim 10 wherein said included angle with the radial plane varies from about 15 degrees to about 25 degrees.

12. A fastener in accordance with claim 9 wherein said decrease for each of said annular combination locking and breakneck grooves is less than 2 degrees.

13. A fastener in accordance with claim 9 wherein said collar is swaged into engagement with at least one of said combination locking and breakneck grooves and said gripping grooves being adapted to be gripped by the gripping means of a tool capable of swaging said collar.

* * * * *